(12) United States Patent
Matsuoka et al.

(10) Patent No.: US 10,277,099 B2
(45) Date of Patent: *Apr. 30, 2019

(54) SYNCHRONOUS MOTOR (71) Applicant: Mitsubishi Electric Corporation, Tokyo (JP)

(72) Inventors: Atsushi Matsuoka, Tokyo (JP); Kazuhiko Baba, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 181 days.

This patent is subject to a terminal disclaimer.

(21) Appl. No.: 14/909,998

(22) PCT Filed: Sep. 2, 2013

(86) PCT No.: PCT/JP2013/073563
§ 371 (c)(1),
(2) Date: Feb. 4, 2016

(87) PCT Pub. No.: WO2015/029256
PCT Pub. Date: Mar. 5, 2015

(65) Prior Publication Data
US 2016/0172949 A1 Jun. 16, 2016

(51) Int. Cl.
*H02K 19/02* (2006.01)
*H02K 3/12* (2006.01)
(Continued)

(52) U.S. Cl.
CPC ............ *H02K 19/02* (2013.01); *H02K 3/12* (2013.01); *H02K 21/16* (2013.01); *H02K 29/03* (2013.01); *H02K 2213/03* (2013.01)

(58) Field of Classification Search
CPC .......... H02K 19/02; H02K 3/12; H02K 21/16; H02K 29/03; H02K 2213/03
(Continued)

(56) References Cited

U.S. PATENT DOCUMENTS 2,371,268 A * 3/1945 Scofield ................ H02K 23/40
310/216.096
2,462,765 A * 2/1949 Oesterlein ............. H02K 5/04
310/216.074
(Continued)

FOREIGN PATENT DOCUMENTS

CN 1579043 A 2/2005
EP 1 487 089 A2 12/2004
(Continued)

OTHER PUBLICATIONS

Extended European Search Report dated Apr. 11, 2017 issued in corresponding EP patent application No. 13892440.2.
(Continued)

*Primary Examiner* — Bernard Rojas
*Assistant Examiner* — Ahmed Elnakib
(74) *Attorney, Agent, or Firm* — Posz Law Group, PLC (57) ABSTRACT

A synchronous motor includes a stator that includes nine teeth that are divided into three phases, each of which includes three adjacent teeth, windings being concentratedly wound around the teeth. The circumferential width of a tip portion of a central tooth among three teeth forming each phase is made smaller than the circumferential widths of tip portions of both-side teeth, and the tooth thickness of the tip portion of the central tooth is made smaller than the tooth thicknesses of the tip portions of the both-side teeth.

4 Claims, 8 Drawing Sheets

(51) Int. Cl.
*H02K 21/16* (2006.01)
*H02K 29/03* (2006.01)

(58) Field of Classification Search
USPC .... 310/195, 208, 198, 169, 216.69–216.073, 310/216.097, 216.092, 269
See application file for complete search history.

(56) References Cited

U.S. PATENT DOCUMENTS

| | | | | |
|---|---|---|---|---|
| 5,804,904 | A * | 9/1998 | Park | H02K 29/03 310/179 |
| 6,943,459 | B2 * | 9/2005 | Hartman | H02J 7/32 290/1 C |
| 2004/0245881 | A1 | 12/2004 | Kadoya et al. | |
| 2004/0251763 | A1 * | 12/2004 | Tamaki | H02K 1/2766 310/156.53 |
| 2005/0044692 | A1 * | 3/2005 | Takano | H02K 3/522 29/596 |
| 2005/0189828 | A1 * | 9/2005 | Nakayama | B62D 5/0403 310/71 |
| 2006/0138883 | A1 * | 6/2006 | Yagai | H02K 3/522 310/71 |
| 2008/0290751 | A1 * | 11/2008 | Hwang | H02K 1/146 310/156.01 |

FOREIGN PATENT DOCUMENTS

| | | | |
|---|---|---|---|
| JP | 54-22107 | U | 2/1979 |
| JP | S5499908 | * | 8/1979 |
| JP | 62-110468 | A | 5/1987 |
| JP | 63-144749 | A | 6/1988 |
| JP | 09-172762 | A | 6/1997 |
| JP | H10126982 | * | 5/1998 |
| JP | 2004-215479 | A | 7/2004 |
| JP | 2004-304928 | A | 10/2004 |
| JP | 2005-102475 | A | 4/2005 |
| JP | 2007-259541 | A | 10/2007 |

OTHER PUBLICATIONS

Duane Hanselman. "4.12 Cogging Torque". Brushless Permanent Magnet Motor Design; Jan. 1, 2006; pp. 111-114; Magna Physics Publishing; Lebanon, Ohio.
Office Action dated Nov. 1, 2016 issued in corresponding JP patent application No. 2015-533923 (and partial English translation).
Office Action dated May 19, 2017 issued in corresponding CN patent application No. 2013800789923 (and partial English translation).
Office action dated Feb. 4, 2019 issued in corresponding Indian application No. 201647009356 (and English translation thereof).

* cited by examiner

SYNCHRONOUS MOTOR

CROSS REFERENCE TO RELATED APPLICATION

This application is a U.S. national stage application of International Patent Application No. PCT/JP2013/073563 filed on Sep. 2, 2013, the disclosure of which is incorporated herein by reference.

TECHNICAL FIELD

The present invention relates to a synchronous motor.

BACKGROUND

In synchronous motors that use permanent magnets, and in particular in three-phase synchronous motors in which the stator windings are concentratedly wound around the teeth, the ratio between the number of magnetic poles of the permanent magnets used in the rotor and the number of slots (i.e., the number of teeth) of the stator is often 2:3.

In a synchronous motor in which the ratio between the number of magnetic poles and the number of slots of the stator is 2:3, openings are often provided between respective adjacent teeth. The openings are provided in order to facilitate interlinkage of the magnetic fluxes generated by the permanent magnets disposed in the rotor with the stator windings and to prevent the magnetic fluxes generated because of the electric current flowing in the stator windings from short-circuiting between the teeth of the stator without the generated magnetic fluxes being directed to the rotor.

However, near the openings, because the magnetic flux density distribution in the gap between the stator and the rotor is disturbed, cogging torque is generated, and the cogging torque causes vibration and noise.

In order to reduce such cogging torque, conventional synchronous motors, a representative example of which is disclosed in Patent Literature 1 listed below, are configured such that a rotor having 8 or 10 magnetic poles and a stator having 9 slots are used and the windings for one phase are concentratedly wound around three adjacent teeth of each phase.

In such synchronous motors, because 9 windings are disposed on the stator, the teeth are disposed at intervals of a mechanical angle of 40 degrees and the windings on the teeth are continuously disposed at intervals of a mechanical angle of 40 degrees. In a rotor having 8 poles, the width of one magnetic pole has a mechanical angle of 45 degrees. In a rotor having 10 poles, the width of one magnetic pole has a mechanical angle of 36 degrees.

Further, pulsations generated while the rotor rotates 360 degrees are determined by the least common multiple of the number of slots of the stator and the number of poles of the rotor. Thus, in the case where a synchronous motor having a ratio between the number of magnetic poles and the number of slots of the stator of 2:3 is, for example, an 8-pole/12-slot synchronous motor, pulsations occur 24 times. However, in the case of an 8-pole/9-slot synchronous motor, pulsations occur 72 times, and in the case of a 10-pole/9-slot synchronous motor, pulsations occur 90 times.

As the number of pulsations increases, the energy of the cogging torque becomes more distributed. Thus, the amplitude of the cogging torque decreases. In other words, an 8-pole/9-slot or 10-pole/9-slot synchronous motor can reduce the cogging torque more than a synchronous motor that has a ratio between the number of magnetic poles and the number of slots of the stator of 2:3.

PATENT LITERATURE

Patent Literature 1: Japanese Patent Application Laid-open No. S62-110468

However, with conventional synchronous motors, a representative of which is disclosed in Patent Literature 1 listed above, windings constituting one phase are disposed continuously and concentratedly; therefore, the rotating magnetic field that is generated by causing an electric current to flow in the stator windings is generated unevenly with respect to the rotary shaft of the rotor. Accordingly, an attraction force and a repulsion force that act between the permanent magnets of the rotor and the stator become unbalanced, thereby generating a large excitation force against the rotary shaft in the radial direction. This excitation force causes vibration and noise.

SUMMARY

The present invention has been achieved in view of the above and an object of the present invention is to provide a synchronous motor that can further reduce vibration and noise.

In order to solve the above problems and achieve the object, an aspect of the present invention is a 10-pole/9-slot synchronous motor that includes nine teeth that are divided into three phases, each of which includes three adjacent teeth, the synchronous motor including a stator in which a circumferential width of an inner-diameter-side tip portion of a first tooth, which is disposed in a center among three teeth forming each phase, is made smaller than a circumferential width of inner-diameter-side tip portions of two second teeth, which are disposed on both sides of the first tooth, and a radial thickness of the inner-diameter-side tip portion of the first tooth is made smaller than a radial thickness of the inner-diameter-side tip portions of the second teeth.

According to the present invention, an effect is obtained where vibration and noise can be further reduced.

DETAILED DESCRIPTION

Exemplary embodiments of a synchronous motor according to the present invention will be described below in detail with reference to the drawings. The present invention is not limited to the embodiments.

Embodiment.

Figure 1:
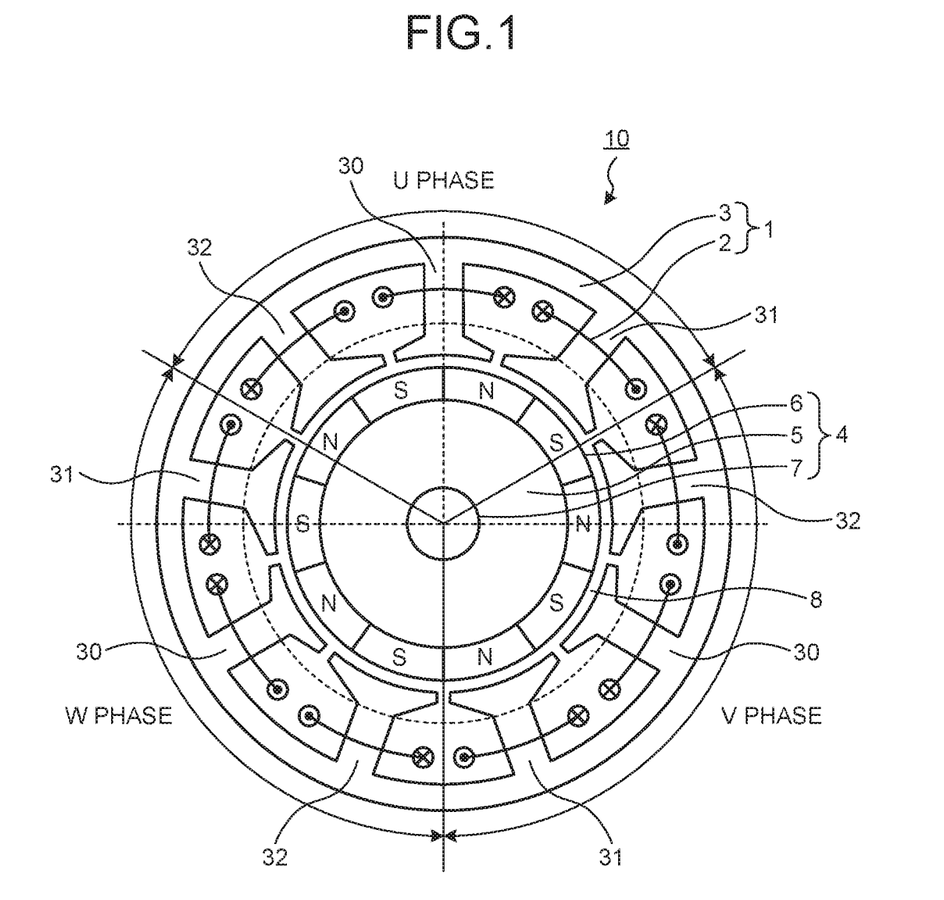
FIG. 1 is a transverse cross-sectional view of a synchronous motor according to an embodiment of the present invention.
Figure 2:
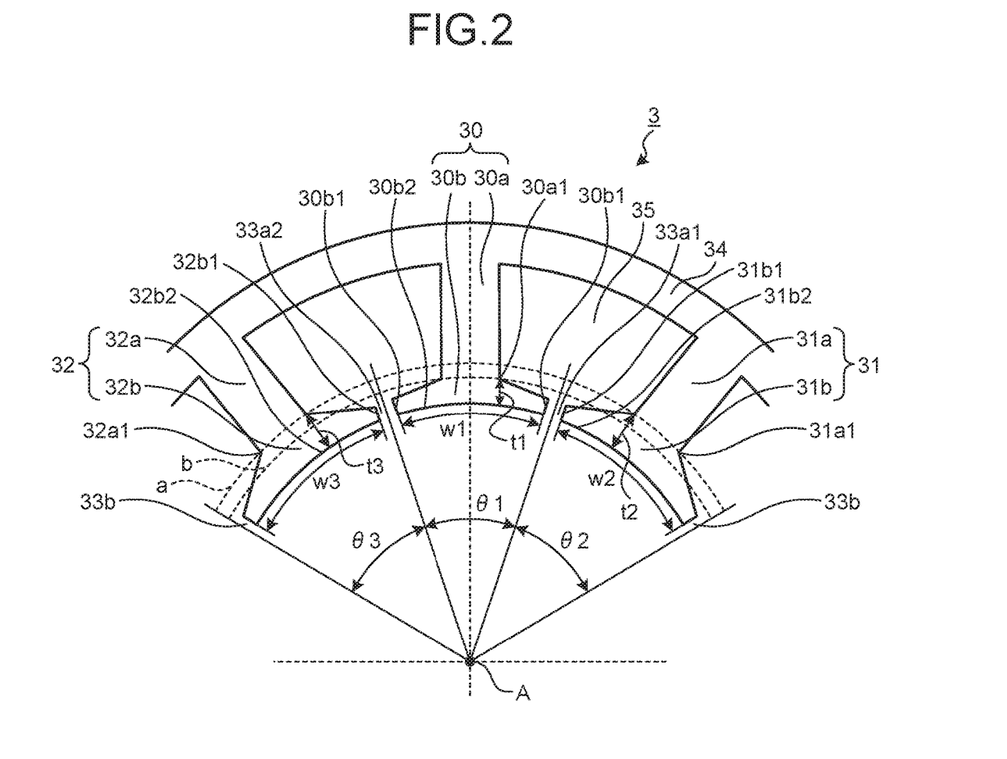
FIG. 2 is an enlarged view of main parts of the synchronous motor illustrated in FIG. 1.

FIG. 1 is a transverse cross-sectional view of a synchronous motor 10 according to an embodiment of the present invention. FIG. 2 is an enlarged view of the main parts of the synchronous motor 10 illustrated in FIG. 1.

The main configuration of the synchronous motor 10 illustrated in FIG. 1 includes a stator 1 and a rotor 4. The rotor 4 is disposed on the inner diameter side of the stator 1 with an air gap 8 therebetween, and a rotary shaft 7 is provided at the center of the rotor 4. Permanent magnets 6 having different poles are alternately disposed circumferentially on the outer diameter surface of a back yoke 5 of the rotor 4. There are 10 poles in the permanent magnets 6 in the rotor 4 exemplified in FIG. 1 and the width of one magnetic pole of the rotor 4 having 10 poles has a mechanical angle of 36 degrees.

A relatively low-cost material having a low magnetic force (such as a ferrite magnet) is, for example, used for the permanent magnets 6. When the synchronous motor 10 is used, for example, for an air blower having a relatively small output, tegular sintered magnets are used for the permanent magnets 6. Bond magnets obtained by molding the mixed material of a resin and magnetic particles in a ring shape may be used for the permanent magnets 6. Ferrite magnets are cheaper than rare-earth magnets; therefore, when ferrite magnets are used for the permanent magnets 6, the excitation force described below can be reduced while achieving a cost reduction.

The stator 1 includes an annularly formed stator core 3 and windings 2 to which power is supplied from an external source.

The stator core 3 includes a yoke 34 and a plurality of teeth (30, 31, 32), and nine teeth (30, 31, 32) are disposed on the inner circumferential side of the stator core 3 at equiangular intervals in the circumferential direction. In the stator 1 exemplified in FIG. 1, the teeth (30, 31, 32) are disposed at intervals of a mechanical angle of 40 degrees around a shaft center A of the stator core 3.

Slots 35 are formed in portions surrounded by the yoke 34, adjacent teeth (30, 31, 32), and tip portions (30b, 31b, 32b) of the respective teeth. Nine slots 35 are provided in the stator core 3 exemplified in FIG. 1.

Slot openings 33a1, 33a2, and 33b for inserting the windings 2 into the slots 35 are formed in the portions where circumferential end portions 30b1, 31b1, and 32b1 of the tip portions 30b, 31b, and 32b of the respective adjacent teeth face each other. In the stator core 3 exemplified in FIG. 1, the slot openings 33a1, 33a2, and 33b are formed such that they have the same width; however, it is satisfactory if the slot openings 33a1, 33a2, and 33b have approximately the same width when an error range is included.

The direction in which the winding 2 that is wound around a central tooth 30 provided in the center among the three teeth forming each of the U phase, V phase, and W phase is wound is opposite to the direction in which the windings 2 that are wound around both-side teeth 31 and 32 provided on both sides of the central tooth 30 are wound. The windings 2 forming the U phase are concentratedly disposed on the three teeth (30, 31, 32) forming the U phase. In a similar manner, the windings 2 forming the V phase are concentratedly disposed on the three teeth (30, 31, 32) forming the V phase, and the windings 2 forming the W phase are concentratedly disposed on the three teeth (30, 31, 32) forming the W phase.

The synchronous motor 10 according to the present embodiment is configured such that a circumferential width w1 of the tip portion 30b of the central tooth 30 included in the teeth group of each phase is smaller than circumferential widths w2 and w3 of the tip portions 31b and 32b of the both-side teeth 31 and 32 included in the corresponding phase.

θ1 is defined, for example, as a width from near the center of the slot opening 33a1 between the circumferential end portion 30b1 on the right side of the central tooth 30 and the circumferential end portion 31b1 on the left side of the both-side tooth 31 to near the center of the slot opening 33a2 between the circumferential end portion 30b1 on the left side of the central tooth 30 and the circumferential end portion 32b1 on the right side of the both-side tooth 32. In the present embodiment, θ1 is set to a mechanical angle within a range of 32 degrees and 40 degrees.

θ2 is defined, for example, as a width from the slot opening 33b between the circumferential end portion 32b1 of the both-side tooth 32 (see FIG. 1) located on the right side of the both-side tooth 31 and the circumferential end portion 31b1 of the both-side tooth 31 in FIG. 2 to near the center of the slot opening 33a1.

θ3 is defined as a width from the slot opening 33b between the circumferential end portion 31b1 of the both-side tooth 31 (see FIG. 1) located on the left side of the both-side tooth 32 and the circumferential end portion 32b1 of the both-side tooth 32 in FIG. 2 to near the center of the slot opening 33a2.

In the present embodiment, the radial thickness (tooth thickness t1) of the tip portion 30b of the central tooth 30 included in the teeth group of each phase is smaller than the radial thickness (tooth thicknesses t2 and t3) of the tip portions 31b and 32b of the both-side teeth 31 and 32 included in the corresponding phase.

The tooth thickness t1 is, for example, defined as a thickness from a root 30a1 between a base portion 30a and the tip portion 30b of the central tooth 30 to an inner diameter side surface 30b2. The tooth thickness t2 is, for example, defined as a thickness from a root 31a1 between a base portion 31a and the tip portion 31b of the both-side tooth 31 to an inner diameter side surface 31b2. The tooth thickness t3 is, for example, defined as a thickness from a root 32a1 between a base portion 32a and the tip portion 32b of the both-side tooth 32 to an inner diameter side surface 32b2.

A dotted line "a" in FIG. 2 indicates a trajectory that passes the roots 31a1 and 32a1 of the both-side teeth 31 and 32 (see FIG. 1) and a dotted line "b" in FIG. 2 indicates a trajectory that passes the roots 30a1 of the central teeth 30 (see FIG. 1). Because the tooth thickness t1 is smaller than the tooth thicknesses t2 and t3, the trajectory "a" is located radially outside the trajectory "b".

In the present embodiment, as an example, the tooth thicknesses t1, t2, and t3 are defined with the roots 30a1, 31a1, and 32a1 as references, respectively; however, it is satisfactory if the thickness of the tip portion 30b is small relative to the thickness of the tip portions 31b and 32b.

If it is assumed that the circumferential central position of the central tooth 30 included in the teeth group of each phase corresponds to the magnetic pole center of the permanent magnet 6, the circumferential central positions of the both-side teeth 31 and 32 included in the teeth group of the corresponding phase are each displaced by a predetermined mechanical angle from the magnetic pole center. In a 10-pole/9-slot synchronous motor, the width of the magnetic pole is a mechanical angle of 36 degrees and the width of each of the teeth 30, 31, and 32 is a mechanical angle of 40 degrees; therefore, the circumferential center of each of the both-side teeth 31 and 32 is displaced from the magnetic pole center by a mechanical angle of 4 degrees. In an 8-pole/9-slot synchronous motor, in a similar manner to the above, the circumferential center of each of the both-side teeth is displaced from the magnetic pole center.

Accordingly, in the 10-pole/9-slot synchronous motor, the induced voltage generated in the windings 2 of the both-side teeth 31 and 32 included in the teeth group of each phase is out of phase with the induced voltage generated in the winding 2 of the central tooth 30 included in the corresponding phase. Therefore, due to the effect of this phase difference, the total induced voltage generated in the three windings 2 forming the teeth group of each phase becomes smaller than the value obtained by multiplying the induced voltage generated in the central tooth 30 by three.

In other words, in the 10-pole/9-slot synchronous motor, the induced voltage generated in the windings 2 of the both-side teeth 31 and 32 is out of phase with the induced voltage generated in the winding 2 of the central tooth 30; therefore, the contribution of the both-side teeth 31 and 32 to the output torque becomes smaller than the contribution of the central tooth 30 to the output torque. The same holds true for the 8-pole/9-slot synchronous motor.

Figure 3:
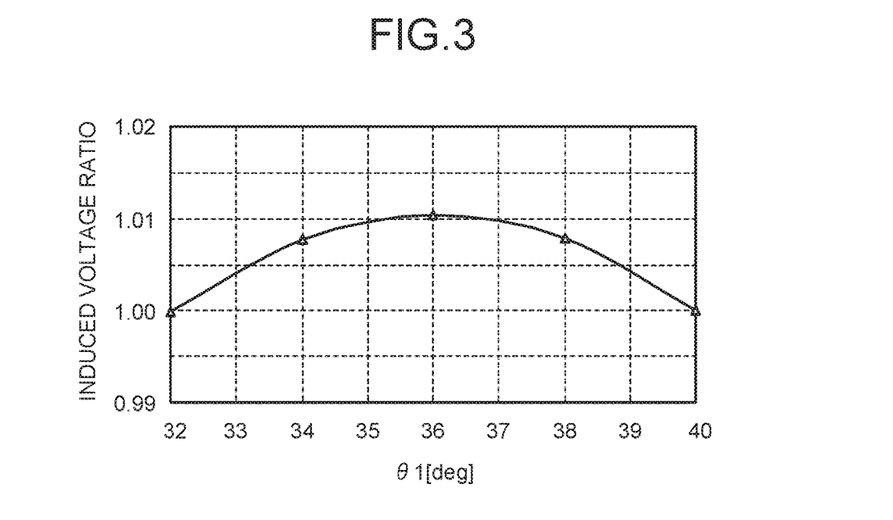
FIG. 3 is a diagram illustrating the relation between the width of a tip portion of a central tooth and the induced voltage ratio in a 10-pole/9-slot synchronous motor.

FIG. 3 is a diagram illustrating the relation between the width of the tip portion of the central tooth and the induced voltage ratio in the 10-pole/9-slot synchronous motor. The data in FIG. 3 represents the result of the magnetic field analysis of the ratio (induced voltage ratio) of the value of the induced voltage when the width θ1 of the tip portion 30b of the central tooth 30 is changed from 40 degrees to 32 degrees to the value of the induced voltage when the teeth are disposed at intervals of a mechanical angle of 40 degrees, which is defined as 1.0.

The horizontal axis represents the width θ1 of the tip portion 30b of the central tooth 30 and the vertical axis represents the induced voltage ratio. As illustrated in FIG. 3, the induced voltage ratio in the 10-pole/9-slot synchronous motor takes a value that is larger than or equal to 1 when the width θ1 is larger than or equal to 32 degrees and smaller than or equal to 40 degrees and is at a maximum when the width θ1 is the same value as the magnetic pole width (mechanical angle of 36 degrees) of the rotor 4.

In the 10-pole/9-slot or 8-pole/9-slot synchronous motor, the windings for one phase are concentratedly disposed; therefore, the rotating magnetic field that is generated when an electric current flows in the windings is generated unevenly with respect to the rotary shaft. Thus, a large excitation force (magnetic attractive force) is generated against the rotary shaft in the radial direction.

Figure 4:
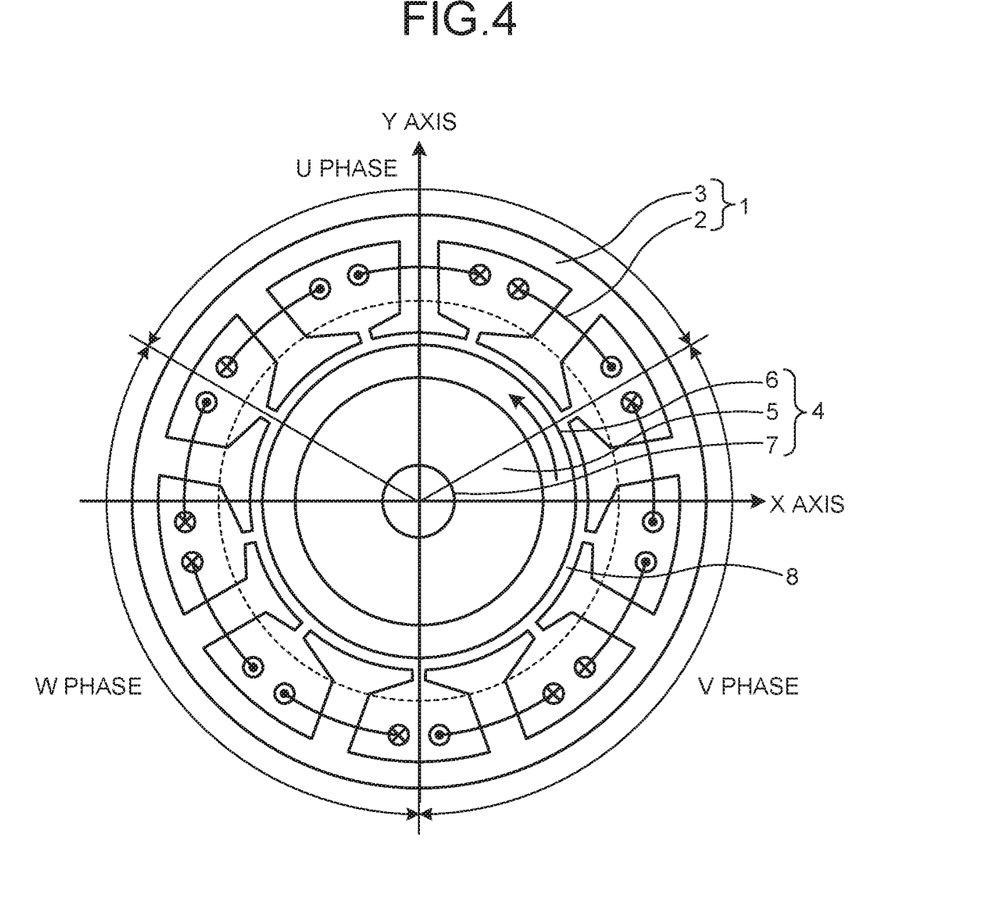
FIG. 4 is a transverse cross-sectional view of the synchronous motor for explaining the excitation force.

FIG. 4 is a transverse cross-sectional view of the synchronous motor 10 for explaining the excitation force. In the synchronous motor 10 in FIG. 4, the rotor 4 having 8 poles or 10 poles is used. In the case of rotating the rotor 4 counterclockwise as illustrated in FIG. 4, an electric current flows in the windings 2 of each phase of the stator 1 in accordance with the positions of the magnetic poles, thereby generating torque.

Figure 5:
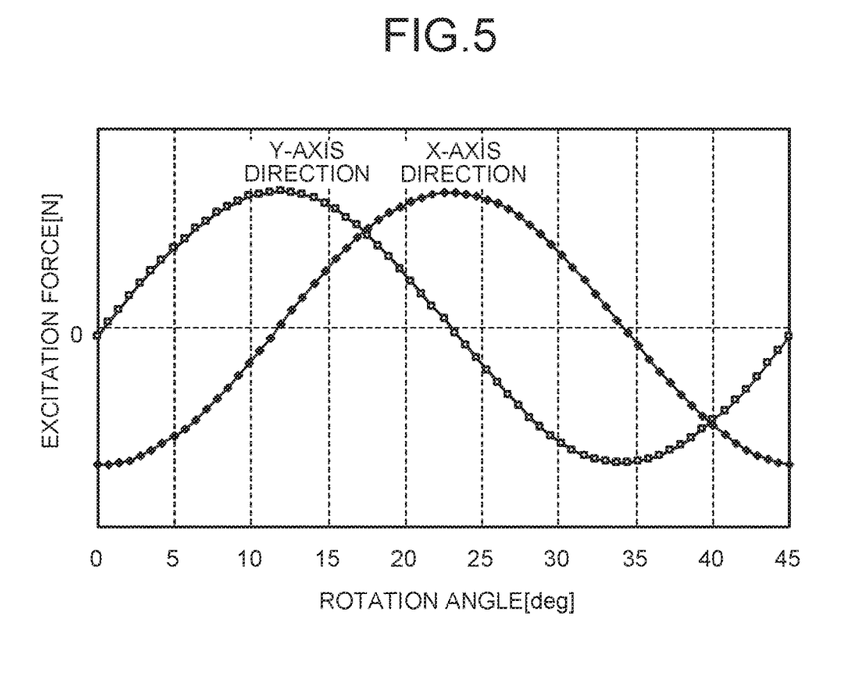
FIG. 5 is a diagram illustrating the excitation force that is generated when a sinusoidal current is caused to flow in the windings of an 8-pole/9-slot synchronous motor.

FIG. 5 is a diagram illustrating the excitation force that is generated when a sinusoidal current is caused to flow in the windings of the 8-pole/9-slot synchronous motor. FIG. 5 illustrates the magnetic field analysis of the excitation force that is generated when the rotor 4 is rotating, where the transverse direction of the synchronous motor 10 is the X axis and the vertical direction of the synchronous motor 10 is the Y axis.

As illustrated in FIG. 5, the excitation force changes substantially sinusoidally in the X-axis direction or the Y-axis direction as the rotor 4 rotates. In the 8-pole/9-slot synchronous motor, when the rotor 4 rotates 360 degrees, the excitation force that fluctuates sinusoidally is generated eight times. In the 10-pole/9-slot synchronous motor, when the rotor 4 rotates 360 degrees, the excitation force that fluctuates sinusoidally is generated ten times.

Figure 6:
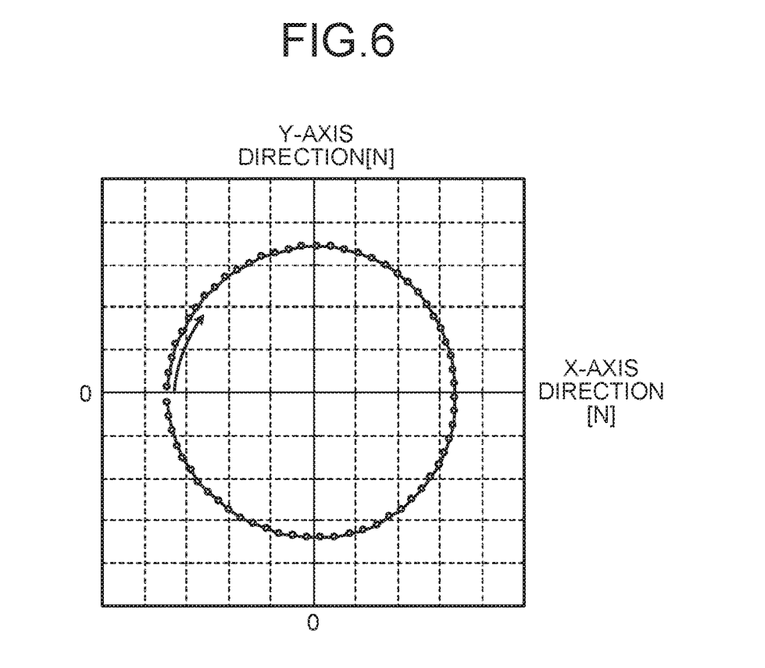
FIG. 6 is a diagram illustrating a trajectory of the excitation force that is generated in a rotor of the synchronous motor illustrated in FIG. 4.

FIG. 6 is a diagram illustrating the trajectory of the excitation force that is generated in the rotor of the synchronous motor illustrated in FIG. 4. In order to recognize the magnitude and direction of the excitation force, in FIG. 6, the X-axis direction indicates the magnitude of the excitation force that is generated in the X-axis direction in FIG. 4 and the Y-axis direction indicates the magnitude of the excitation force that is generated in the Y-axis direction in FIG. 4. As exemplified in FIG. 6, the excitation force follows a substantially circular trajectory and is generated with a substantially constant magnitude while changing the direction as the rotor 4 rotates.

The absolute value of the excitation force exhibits an increasing trend as the torque generated in the synchronous motor 10 increases; however, it differs depending on the size of the synchronous motor or the like. Thus, FIG. 6 only illustrates the trend of the excitation force that is generated in the 8-pole/9-slot or 10-pole/9-slot synchronous motor and does not illustrate specific numerical values.

Figure 7:
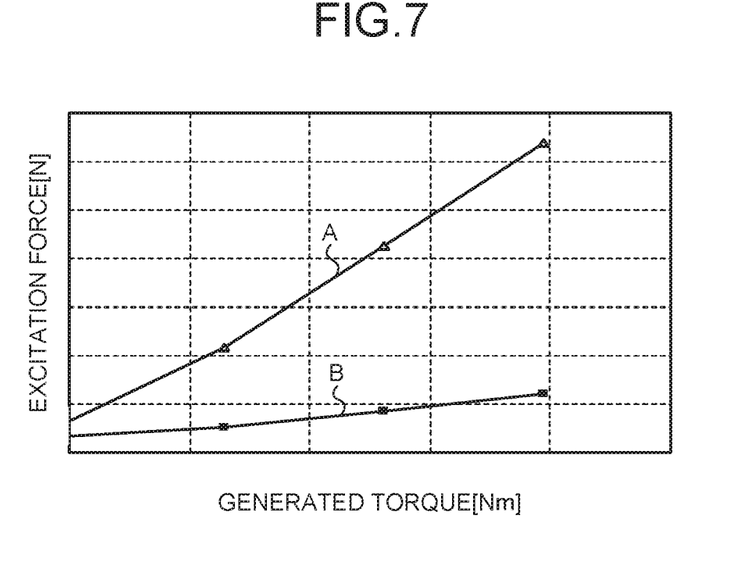
FIG. 7 is a diagram illustrating the relation between the generated torque and the excitation force in the synchronous motor illustrated in FIG. 4.

FIG. 7 is a diagram illustrating the relation between the generated torque and the excitation force in the synchronous motor illustrated in FIG. 4. FIG. 7 illustrates a curve A, which indicates the relation between the torque and the excitation force in the 8-pole/9-slot synchronous motor, and a curve B, which indicates the relation between the torque and the excitation force in the 10-pole/9-slot synchronous motor. In these synchronous motors, the permanent magnets 6 having an equivalent magnetic force are used in the rotor 4.

As illustrated in FIG. 7, both the excitation force in the 10-pole/9-slot synchronous motor and the excitation force in the 8-pole/9-slot synchronous motor increase in proportion to the generated torque. However, the excitation force in the 10-pole/9-slot synchronous motor is substantially smaller than the excitation force in the 8-pole/9-slot synchronous motor and is specifically smaller than or equal to one-fourth the excitation force of the 8-pole/9-slot synchronous motor.

Figure 8:
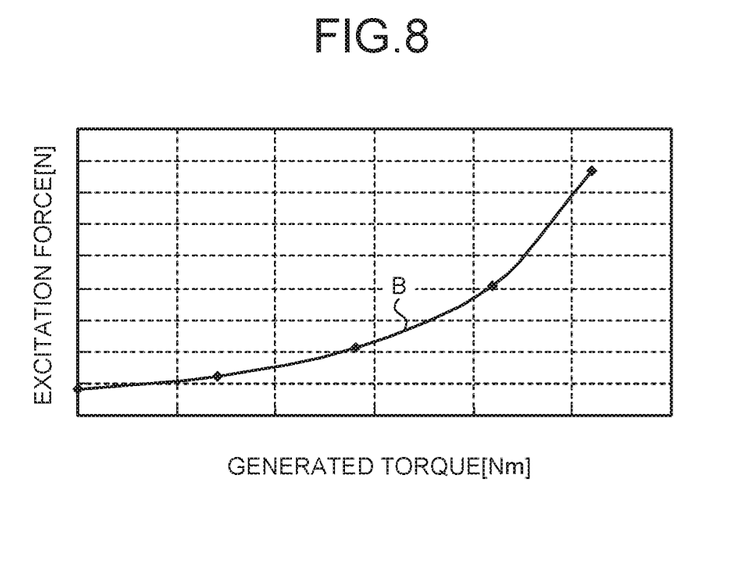
FIG. 8 is a diagram in which the curve B illustrated in FIG. 7 is enlarged.

FIG. 8 is a diagram in which the curve B illustrated in FIG. 7 is enlarged. In FIG. 8, for ease of understanding of the change of the curve B in FIG. 7, the values on the vertical scale are different from the values on the vertical scale in FIG. 7. As illustrated in FIG. 8, the excitation force in the 10-pole/9-slot synchronous motor exhibits characteristics close to a quadratic function with respect to the generated torque. In such a manner, in the 10-pole/9-slot synchronous motor, the excitation force exhibits a tendency to increase sharply as the generated torque increases. Due to this tendency, it can be presumed that the magnetic flux density of the stator core 3 affects the excitation force.

Figure 9:
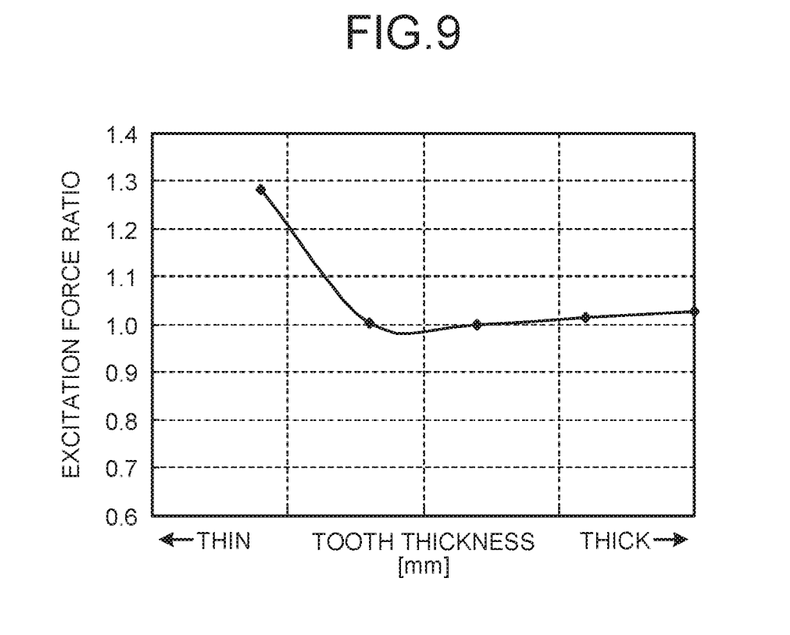
FIG. 9 is a diagram illustrating the relation between the radial thickness of a tooth tip portion in the 10-pole/9-slot synchronous motor and the excitation force ratio in the synchronous motor.

FIG. 9 is a diagram illustrating the relation between the radial thickness of the tooth tip portion in the 10-pole/9-slot synchronous motor and the excitation force ratio in the synchronous motor. The horizontal axis indicates the tooth thickness (t1, t2, t3) in the 10-pole/9-slot synchronous motor and the vertical axis indicates the excitation force ratio in the 10-pole/9-slot synchronous motor. The data in FIG. 9 represents the result of the magnetic field analysis of the ratio (excitation force ratio) of the value of the excitation force when the tooth thickness (t1, t2, t3) is changed to the minimum value of the excitation force when the tooth thickness (t1, t2, t3) is changed, which is defined as 1.0.

The generated torque when the data in FIG. 9 is obtained is equivalent to the rated output in the 10-pole/9-slot synchronous motor. As illustrated in FIG. 9, in the 10-pole/9-slot synchronous motor, the excitation force ratio indicates a substantially constant value in a region in which the tooth thickness (t1, t2, t3) is relatively large. In contrast, in a region in which the tooth thickness is relatively small, the excitation force ratio increases as the tooth thickness decreases. It can be presumed that this tendency is because the magnetic path narrows as the tooth thickness decreases and thus the magnetic flux density in the tooth tip portion increases, thereby resulting in an increase in the excitation force. This can be presumed to be due to the same reason as the following: the electric current increases as the torque of the electric motor is increased and thus the magnetic field density in the tooth tip portion increases, thereby resulting in an increase in the excitation force. In other words, it can be presumed that this tendency is because of an increase in the magnetic field density in the tooth tip portion.

Figure 10:
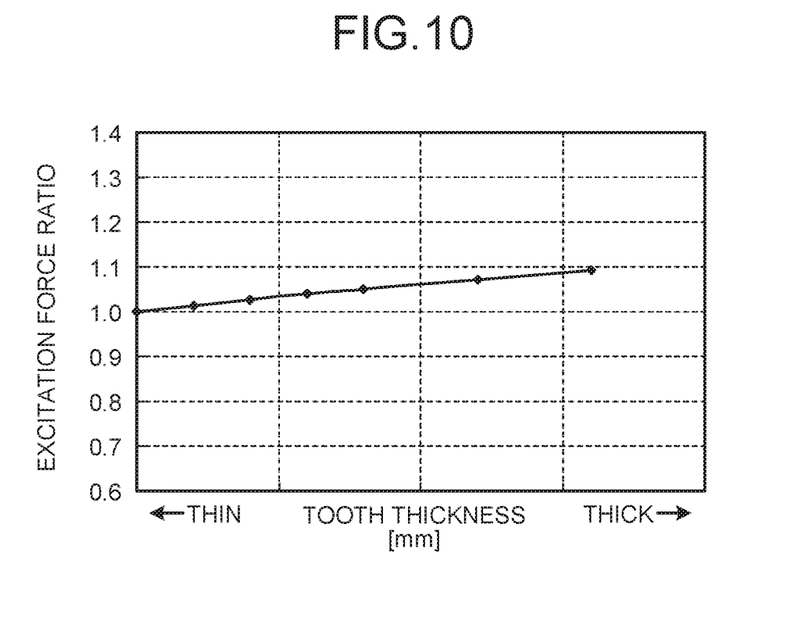
FIG. 10 is a diagram illustrating the relation between the tooth radial thickness and the excitation force in the 8-pole/9-slot synchronous motor.

FIG. 10 is a diagram illustrating the relation between the tooth radial thickness and the excitation force in the 8-pole/9-slot synchronous motor. The horizontal axis indicates the tooth thickness in the 8-pole/9-slot synchronous motor and the vertical axis indicates the excitation force ratio in the 8-pole/9-slot synchronous motor. The data in FIG. 10 represents the result of the magnetic field analysis of the ratio (excitation force ratio) of the value of the excitation force when the tooth thickness is changed to the minimum value of the excitation force when the tooth thickness is changed, which is defined as 1.0.

The generated torque when the data in FIG. 10 is obtained is equivalent to the rated output in the 8-pole/9-slot synchronous motor. As illustrated in FIG. 10, in the 8-pole/9-slot synchronous motor, the excitation force ratio changes little with respect to the change in the tooth thickness.

As is apparent from the results in FIG. 9 and FIG. 10, the effect of suppressing the excitation force of the rotor by increasing the tooth thickness can be obtained in the 10-pole/9-slot synchronous motor. In the synchronous motor having the ratio between the number of magnetic poles and the number of slots of 2:3, when the three windings 2 forming one phase are disposed symmetrically about the rotary shaft 7, the magnetic attractive forces are canceled out with respect to the rotary shaft 7; therefore, the excitation force of the rotor 4 as described above is not generated. Therefore, in the synchronous motor configured as above, even when the tooth thickness t1 is made smaller than the tooth thicknesses t2 and t3 as illustrated in FIG. 2, the excitation force does not change and thus an effect similar to the above cannot be obtained.

However, when the value of the air gap 8 is made constant and the tooth thickness is increased in order to suppress the excitation force, the cross-sectional area of the slots 35, into which the windings 2 are stored, is reduced. As a measure against this, it is possible to reduce the wire diameter of the copper wires used for the windings 2; however, when the wire diameter of the windings is reduced, the loss (copper loss) generated in the copper wires increases due to the increase in the resistance of the windings 2. Therefore, the efficiency of the synchronous motor is reduced.

As a measure against such a reduction in efficiency, it is possible to set, in the teeth group of each phase, the circumferential width w1 of the tip portion 30b of the central tooth 30 to be smaller than the circumferential widths w2 and w3 of the tip portions 31b and 32b of the both-side teeth 31 and 32. With this configuration, the induced voltage is increased and thus an electric current is reduced, thereby preventing an increase in copper loss. Therefore, a reduction of the efficiency can be suppressed.

In this case, the magnetic attractive force (i.e., excitation force generated in the radial direction against the rotary shaft) generated between the tip portion 30b and the rotor 4 may be reduced as a result of a reduction of the circumferential width w1 of the tip portion 30b of the central tooth.

With the use of such a reduction in the magnetic attractive force, in the present embodiment, the tooth thickness t1 of the central tooth 30 is made smaller than the tooth thicknesses t2 and t3 of the both-side teeth 31 and 32. With this configuration, the cross-sectional area of the slots 35 can be relatively increased; therefore, an increase in the magnetic attractive force can be suppressed even when the number of windings of the central tooth 30 is increased.

Next, an explanation will be given of the magnitude of the excitation force when the tooth thickness is changed.

Figure 11:
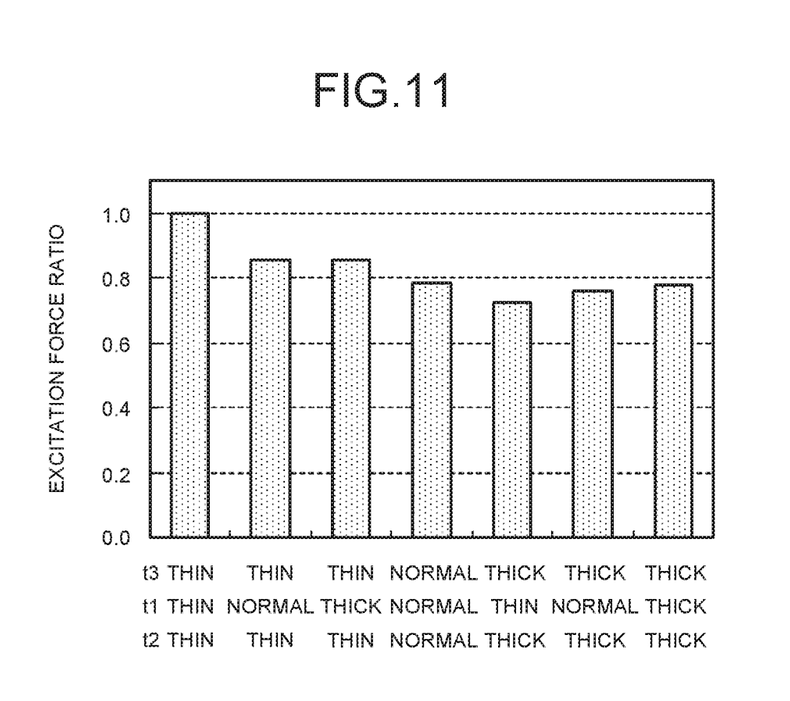
FIG. 11 is a first diagram illustrating the relation between the thickness of tooth tip portions and the excitation force ratio in the 10-pole/9-slot synchronous motor.

FIG. 11 is a first diagram illustrating the relation between the thickness of the tooth tip portions and the excitation force ratio in the 10-pole/9-slot synchronous motor. The data in FIG. 11 represents the result of the magnetic field analysis of the ratio (excitation force ratio) of the value of the excitation force when each tooth thickness is changed to the value of the excitation force when the tooth thicknesses t1, t2, and t3 of three teeth forming each phase are set to a minimum, which is defined as 1.0, in the 10-pole/9-slot synchronous motor 10 in which the width θ1 of the tip portion 30b is set to 40 degrees.

In FIG. 11, the smallest tooth thickness is described as "thin", the largest tooth thickness is described as "thick", and the intermediate thickness between "thin" and "thick" is described as "normal".

The three pieces of data on the left side indicate the excitation force ratio in the 10-pole/9-slot synchronous motor 10 in which the tooth thickness t2 and the tooth thickness t3 are set small and the tooth thickness t1 is set to three different thicknesses. The three pieces of data on the right side indicate the excitation force ratio in the 10-pole/9-slot synchronous motor 10 in which the tooth thickness t2 and the tooth thickness t3 are set large and the tooth thickness t1 is set to three different thicknesses. The data in the center indicates the excitation force ratio in the 10-pole/9-slot synchronous motor 10 in which the tooth thickness t1, the tooth thickness t2, and the tooth thickness t3 are set to the intermediate thickness.

According to the data in FIG. 11, the excitation force ratio in the cases other than the case where the tooth thicknesses t1, t2, and t3 are all "thin" indicates a low value compared with the excitation force ratio (data on the leftmost side) where the tooth thicknesses t1, t2, and t3 are all "thin".

There is no significant difference between the excitation force ratio (data in the center) when the tooth thicknesses t1, t2, and t3 are all "normal" and the excitation force ratio (data on the rightmost side) when the tooth thicknesses t1, t2, and t3 are all "thick".

In contrast, the excitation force ratio (second and third pieces of data from the right) when the tooth thickness t2 and the tooth thickness t3 are "thick" and the tooth thickness t1 is "normal" or "thin" exhibits a decreasing trend. However, the excitation force ratio of the second and third pieces of data from the right is approximately the same as the excitation force ratio in the center. Therefore, from the perspective of ensuring the slot cross-sectional area, a significant effect cannot be obtained by reducing only the tooth thickness t1.

Figure 12:
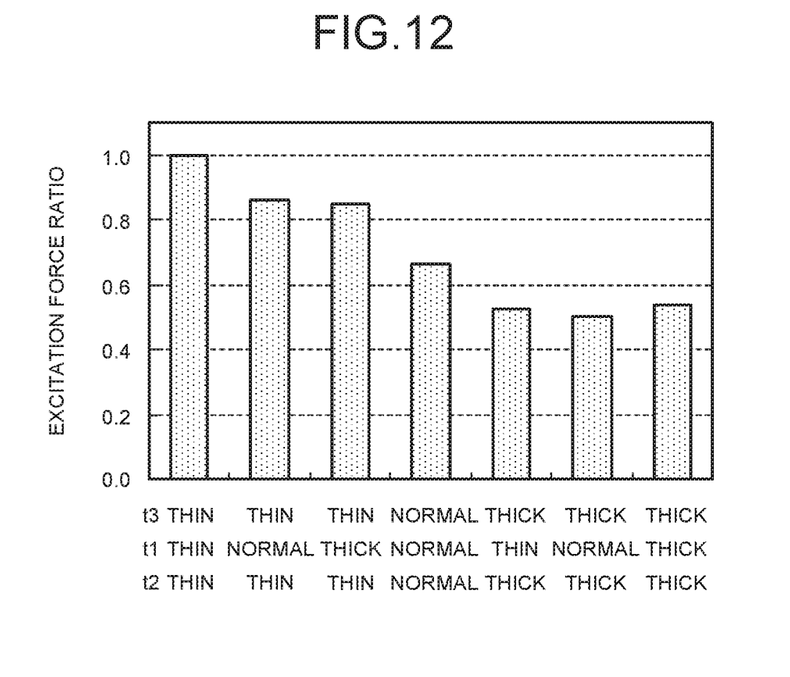
FIG. 12 is a second diagram illustrating the relation between the thickness of the tooth tip portions and the excitation force ratio in the 10-pole/9-slot synchronous motor.

FIG. 12 is a second diagram illustrating the relation between the thickness of the tooth tip portions and the excitation force ratio in the 10-pole/9-slot synchronous motor. FIG. 12 is different from FIG. 11 in that the 10-pole/9-slot synchronous motor 10 in which the width θ1 of the tip portion 30b is set to 36 degrees is used.

According to the data in FIG. 12, it is found that there is a significant difference between the third excitation force ratio from the right and the fourth excitation force ratio from the right. In other words, when the width θ1 of the tip portion 30b is set to 36 degrees, even when the tooth thickness t1 is reduced, the excitation force can be reduced by increasing the tooth thickness t2 and the tooth thickness t3. This trend becomes more significant as the width θ1 of the tip portion 30b, i.e., the circumferential width w1 of the tip portion 30b, is reduced.

Figure 13:
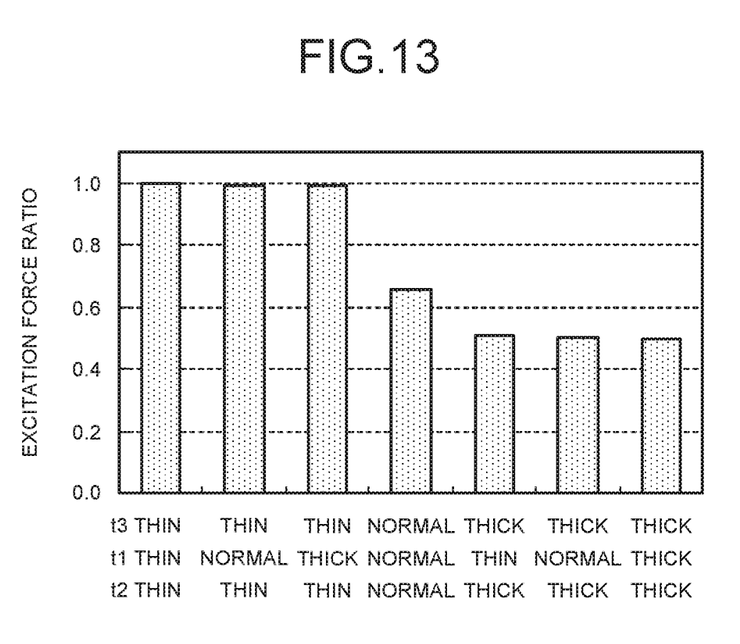
FIG. 13 is a third diagram illustrating the relation between the thickness of the tooth tip portions and the excitation force ratio in the 10-pole/9-slot synchronous motor.

FIG. 13 is a third diagram illustrating the relation between the thickness of the tooth tip portions and the excitation force ratio in the 10-pole/9-slot synchronous motor. FIG. 13 is different from FIG. 11 in that the 10-pole/9-slot synchronous motor 10 in which the width θ1 of the tip portion 30b is set to 32 degrees is used.

In the synchronous motor 10 in which the width θ1 of the tip portion 30b is set to 32 degrees, it is found that the tooth thickness t2 and the tooth thickness t3 have a dominant effect on the excitation force, and, as a result, the third excitation force ratio from the right is reduced compared with the excitation force ratio illustrated in FIG. 12.

As described above, the synchronous motor 10 according to the present embodiment is the 10-pole/9-slot synchronous motor 10 that includes nine teeth that are divided into three phases, each of which includes three adjacent teeth, and that includes the stator 1 in which the circumferential width w1 of the inner-diameter-side tip portion (30b) of the first tooth (30), which is disposed in the center among three teeth forming each phase, is made smaller than the circumferential widths w2 and w3 of the inner-diameter-side tip portions (31b, 32b) of the two second teeth (31, 32), which are disposed on both sides of the first tooth, and the radial thickness (t1) of the inner-diameter-side tip portion of the first tooth is made smaller than the radial thickness (t2, t3) of the inner-diameter-side tip portion of each of the second teeth. With this configuration, the radial excitation force that is generated in principle in the 10-pole/9-slot synchronous motor is reduced. Moreover, a larger induced voltage can be generated by reducing the circumferential width w1 of the central tooth 30 such that it is smaller than the circumferential widths t2 and t3 of the both-side teeth 31 and 32; therefore, the efficiency of the synchronous motor 10 can be improved. Furthermore, because the tooth thickness t1 of the central tooth 30 is made smaller than the tooth thicknesses t2 and t3 of the both-side teeth 31 and 32, a reduction in the cross-sectional area of the slots 35 is suppressed. Therefore, a reduction in efficiency of the synchronous motor 10 can be suppressed. As a result, the efficiency can be improved while further reducing vibration and noise.

Moreover, in the synchronous motor 10 according to the present embodiment, the width w1 from the slot opening (33a1) between the first tooth (30) and one of the second teeth (31) to the slot opening (33a2) between the first tooth (30) and the other of the second teeth (32) is made larger than a mechanical angle of 32 degrees and smaller than a mechanical angle of 40 degrees. With this configuration, the winding factor increases compared with the conventional 10-pole/9-slot synchronous motor that is formed such that the width w1 is 40 degrees; therefore, high output and high efficiency can be achieved. The winding factor is an index that indicates how efficiently the magnetic flux generated from the permanent magnets 6 of the rotor 4 interlinks the windings 2.

Furthermore, in the synchronous motor 10 according to the present embodiment, the width w1 from the slot opening (33a1) between the first tooth (30) and one of the second teeth (31) to the slot opening (33a2) between the first tooth (30) and the other of the second teeth (32) is made such that the width becomes a mechanical angle of 36 degrees. With this configuration, among the synchronous motors 10 in which the circumferential width w1 of the tip portion 30b of the central tooth 30 is made smaller than the circumferential widths w2 and w3 of the tip portions 31b and 32b of the both-side teeth 31 and 32, the winding factor becomes the largest. Therefore, high output and high efficiency can be achieved.

The embodiment of the present invention describes an example of the details of the present invention and it is obvious that the embodiment can be combined with other publicly known technologies and can be changed, for example, by omitting a part thereof without departing from the scope of the present invention.

INDUSTRIAL APPLICABILITY

As described above, the present invention can be applied to a synchronous motor and is particularly useful as an invention that can achieve further reduction in vibration and noise.

The invention claimed is:

1. A 10-pole/9-slot synchronous motor, comprising:
a stator that includes an annularly formed stator core and nine teeth divided into three phases, each of the three phases includes three adjacent teeth, a winding being concentratedly wound around each of the teeth, the three adjacent teeth includes a first tooth, which is disposed in a center among the three teeth forming each phase and two second teeth, which are disposed on both sides of the first tooth, wherein a circumferential width of an inner-diameter-side tip portion of the first tooth is smaller than a circumferential width of inner-diameter-side tip portions of the two second teeth, a radial thickness of the inner-diameter-side tip portion of the first tooth is smaller than a radial thickness of the inner-diameter-side tip portions of the second teeth, all radial lengths of all teeth are equal, all arc lengths between two adjacent teeth that extend on the annularly formed stator core are equal, all of the radial lengths are shorter than all of the arc lengths between two adjacent teeth, and each of the nine teeth are separated by equally-sized slot openings, circumferential widths of the equally-sized slot openings between the inner-diameter-side tip portions of the nine teeth are equal to each other, the circumferential widths of the equally-sized slot openings extend between the circumferential widths of the inner-diameter-side tip portions of each of the nine teeth.

2. The 10-pole/9-slot synchronous motor according to claim 1, wherein a width from a slot opening between the first tooth and one of the second teeth to a slot opening between the first tooth and another of the second teeth is made larger than a mechanical angle of 32degrees and smaller than a mechanical angle of 40 degrees.

3. The 10-pole/9-slot synchronous motor according to claim 1, wherein a width from a slot opening between the first tooth and one of the second teeth to a slot opening between the first tooth and another of the second teeth is made such that the width becomes a mechanical angle of 36 degrees.

4. The 10-pole/9-slot synchronous motor according to claim 1, wherein each of the three adjacent teeth include a base portion that connects the inner-diameter-side tip portions of the first tooth and the second teeth to the stator core, and the base portion of each of the three adjacent teeth has a same circumferential width.

\* \* \* \* \*